US010758822B2

(12) United States Patent
Chigusa (10) Patent No.: US 10,758,822 B2
(45) Date of Patent: Sep. 1, 2020

(54) MAIN BEAM DIRECTION DETERMINATION DEVICE, MAIN BEAM DIRECTION DETERMINATION METHOD, AND PROGRAM (71) Applicant: Sony Interactive Entertainment Inc., Tokyo (JP)

(72) Inventor: Issei Chigusa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 199 days.

(21) Appl. No.: 15/776,245

(22) PCT Filed: Dec. 19, 2016

(86) PCT No.: PCT/JP2016/087750
§ 371 (c)(1),
(2) Date: May 15, 2018

(87) PCT Pub. No.: WO2017/110732
PCT Pub. Date: Jun. 29, 2017

(65) Prior Publication Data
US 2019/0358537 A1 Nov. 28, 2019

(30) Foreign Application Priority Data
Dec. 24, 2015 (JP) ................................ 2015-251361

(51) Int. Cl.
*A63F 13/323* (2014.01)
*A63F 13/327* (2014.01)
(Continued)

(52) U.S. Cl.
CPC .......... *A63F 13/323* (2014.09); *A63F 13/327* (2014.09); *G06K 9/00362* (2013.01);
(Continued)

(58) Field of Classification Search
USPC .......................................................... 463/31
See application file for complete search history.

(56) References Cited

U.S. PATENT DOCUMENTS 9,515,372 B2    12/2016  Chang
2011/0317874 A1*  12/2011  Ikenoue ............. G06K 9/00315
                                                       382/103
(Continued)

FOREIGN PATENT DOCUMENTS

JP            1100893 A      1/1999
JP         20100191826 A    9/2010
(Continued)

OTHER PUBLICATIONS

Extended European Search Report for corresponding EP Application No. 16878621.38, 7 pages, dated Jul. 17, 2019.
(Continued)

*Primary Examiner* — Pierre E Elisca
(74) *Attorney, Agent, or Firm* — Matthew B. Dernier, Esq.

(57) ABSTRACT

An image acquisition unit acquires an image that includes a figure of the user wearing a head-mounted display. A narrowed-down region specification unit specifies, within the image, a region that includes a figure of the head of the user when a posture of the user stretches in a vertical direction. A secondary candidate sector selection unit selects, from among primary candidates of a plurality of the main beam directions, secondary candidates that are directions made to be correspondent to positions within the region. A sector-level sweep processing execution unit determines, from among the secondary candidates, a main beam direction for communication with the head-mounted display. The region has a projection part.

8 Claims, 11 Drawing Sheets (51) Int. Cl.
*G06K 9/00* (2006.01)
*H04B 7/08* (2006.01)
*A63F 13/213* (2014.01)
*A63F 13/215* (2014.01)

(52) U.S. Cl.
CPC ............ H04B 7/088 (2013.01); *A63F 13/213* (2014.09); *A63F 13/215* (2014.09); *A63F 2300/1031* (2013.01); *A63F 2300/1081* (2013.01); *A63F 2300/1087* (2013.01)

(56) References Cited

U.S. PATENT DOCUMENTS

| | | | | |
|---|---|---|---|---|
| 2012/0250940 | A1* | 10/2012 | Kasahara | G06T 19/006 |
| | | | | 382/103 |
| 2013/0017836 | A1* | 1/2013 | Chang | H01Q 1/1257 |
| | | | | 455/452.1 |
| 2013/0176221 | A1* | 7/2013 | Lapstun | G06F 3/0321 |
| | | | | 345/158 |
| 2014/0204120 | A1* | 7/2014 | Moteki | G03B 35/08 |
| | | | | 345/633 |

FOREIGN PATENT DOCUMENTS

| | | |
|---|---|---|
| JP | 2013051570 A | 3/2013 |
| JP | 2014525191 A | 9/2014 |

OTHER PUBLICATIONS

International Preliminary Report on Patentability and Written Opinion for corresponding PCT Application No. PCT/JP2016/087750, 6 pages, dated Jul. 5, 2018.

International Search Report for corresponding PCT Application No. PCT/JP2016/087750, 2 pages, dated Mar. 7, 2017.

* cited by examiner

| PRIMARY CANDIDATE SECTOR ID | MAIN BEAM ANGLE PARAMETER (φ, θ) | INTRA-PHOTOGRAPHIC IMAGE COORDINATE PARAMETER (x, y) |
|---|---|---|
| 1 | (φ1, θ1) | (x1,y1) |
| 2 | (φ1, θ2) | (x1,y2) |
| 3 | (φ1, θ3) | (x1,y3) |
| 4 | (φ1, θ4) | (x1,y4) |
| 5 | (φ1, θ5) | (x1,y5) |
| 6 | (φ1, θ6) | (x1,y6) |
| 7 | (φ1, θ7) | (x1,y7) |
| 8 | (φ1, θ8) | (x1,y8) |
| 9 | (φ2, θ1) | (x2,y1) |
| 10 | (φ2, θ2) | (x2,y2) |
| 11 | (φ2, θ3) | (x2,y3) |
| 12 | (φ2, θ4) | (x2,y4) |
| 117 | (φ15, θ5) | (x15,y5) |
| 118 | (φ15, θ6) | (x15,y6) |
| 119 | (φ15, θ7) | (x15,y7) |
| 120 | (φ15, θ8) | (x15,y8) |

MAIN BEAM DIRECTION DETERMINATION DEVICE, MAIN BEAM DIRECTION DETERMINATION METHOD, AND PROGRAM

TECHNICAL FIELD

The present invention relates to a main beam direction determination device, a main beam direction determination method, and a program.

BACKGROUND ART

In a wireless communication field, there is known a technology for determining, from among a plurality of candidates of main beam directions, a direction in which a communication quality is high at the time when communication is performed as the main beam direction used in communication. As an example of such a technology, a sector-level sweep in beam forming is included.

SUMMARY

Technical Problems

In recent years, for example, it is examined that dynamic images expressing a play status of a game, which is generated by a game device that executes a game program, are transmitted wirelessly to a head-mounted display (HMD) and the HMD is allowed to display the dynamic images. This process permits a user wearing the HMD to freely move a head and play a game.

In a situation in which such a user plays a game, it is important to shorten a time required for determining the main beam direction used in communication in order not to break up communication as much as possible. Here, for example, when candidates in a range in which the head of the user is highly possibly present are narrowed down from among a plurality of candidates of the main beam directions and then the main beam direction is determined from among the above candidates, the main beam direction can be determined at short times.

When narrowing-down of the candidates of the main beam directions is performed, in the situation in which the user plays a game, more appropriate narrowing down can be performed in view of the fact that there is a bias in a direction in which the head of the user moves. For example, a possibility is high that the head of the user moves in a vertical direction by an operation of jumping or an operation of squatting, or the head of the user moves back and forth and around by an operation of tilting a neck or body; and on the other hand, the possibility is low that the head of the user moves in an oblique direction such as upper left, upper right, lower left, or lower right. Therefore, for example, it is preferable to exclude, from the candidates of the main beam directions, a range in which the head of the user moves in the oblique direction.

As described above, for example, the candidates of the main beam directions can be narrowed down more appropriately; however, in a related technology, in a situation in which the user plays a game, the narrowing down of the candidates of the main beam directions has not been performed in view of the fact that there is a bias in a direction in which the head of the user moves.

In view of the foregoing, it is an object of the present invention to provide a main beam direction determination device, a main beam direction determination method, and a program that are capable of performing the narrowing down of the candidates of the main beam directions, in the situation in which the user plays a game, in view of the fact that there is a bias in a direction in which the head of the user moves.

Solution to Problems

In order to solve the problem described above, a main beam direction determination device according to the present invention includes an image acquisition unit, a region specification unit, a secondary candidate selection unit, and a main beam direction determination unit. The image acquisition unit acquires an image including a figure of a user wearing a head-mounted display. The region specification unit specifies, within the image, a region including a figure of a head of the user in a case in which a posture of the user stretches in a vertical direction. The secondary candidate selection unit selects, from among a plurality of primary candidates of main beam directions, secondary candidates that are directions made to be correspondent to positions within the region. The main beam direction determination unit determines, from among the secondary candidates, the main beam direction for communication with the head-mounted display. The region has a projection part.

In one mode of the present invention, the region is a cross-shaped region.

Further, in another mode of the present invention, the region is bilaterally symmetrical.

In this mode, the main beam direction determination device further includes a centerline specification unit configured to specify, within the image, a center line of a figure of the head of the user. The region specification unit may specify a bilaterally symmetrical region with the center line as a center.

Further, in another mode of the present invention, the region occupied by the projection part includes a region above the figure of the head of the user.

Further, in another mode of the present invention, a size of the region is the size proportional to a size of the figure of the head of the user.

Further, a main beam direction determination method according to the present invention includes a step of acquiring an image including a figure of a user wearing a head-mounted display, a step of specifying, within the image, a region including a figure of a head of the user in a case in which a posture of the user stretches in a vertical direction, a step of selecting, from among a plurality of primary candidates of main beam directions, secondary candidates that are directions made to be correspondent to positions within the region, and a step of determining, from among the secondary candidates, the main beam direction for communication with the head-mounted display. The region has a projection part.

Further, a program according to the present invention for causing a computer to execute a procedure for acquiring an image including a figure of a user wearing a head-mounted display, a procedure for specifying, within the image, a region including a figure of a head of the user in a case in which a posture of the user stretches in a vertical direction, a procedure for selecting, from among a plurality of primary candidates of main beam directions, secondary candidates that are directions made to be correspondent to positions within the region, and a procedure for determining, from among the secondary candidates, the main beam direction for communication with the head-mounted display. The region has a projection part.

DESCRIPTION OF EMBODIMENT

Hereinafter, an embodiment of the present invention will be described with reference to the drawings.

Figure 1:
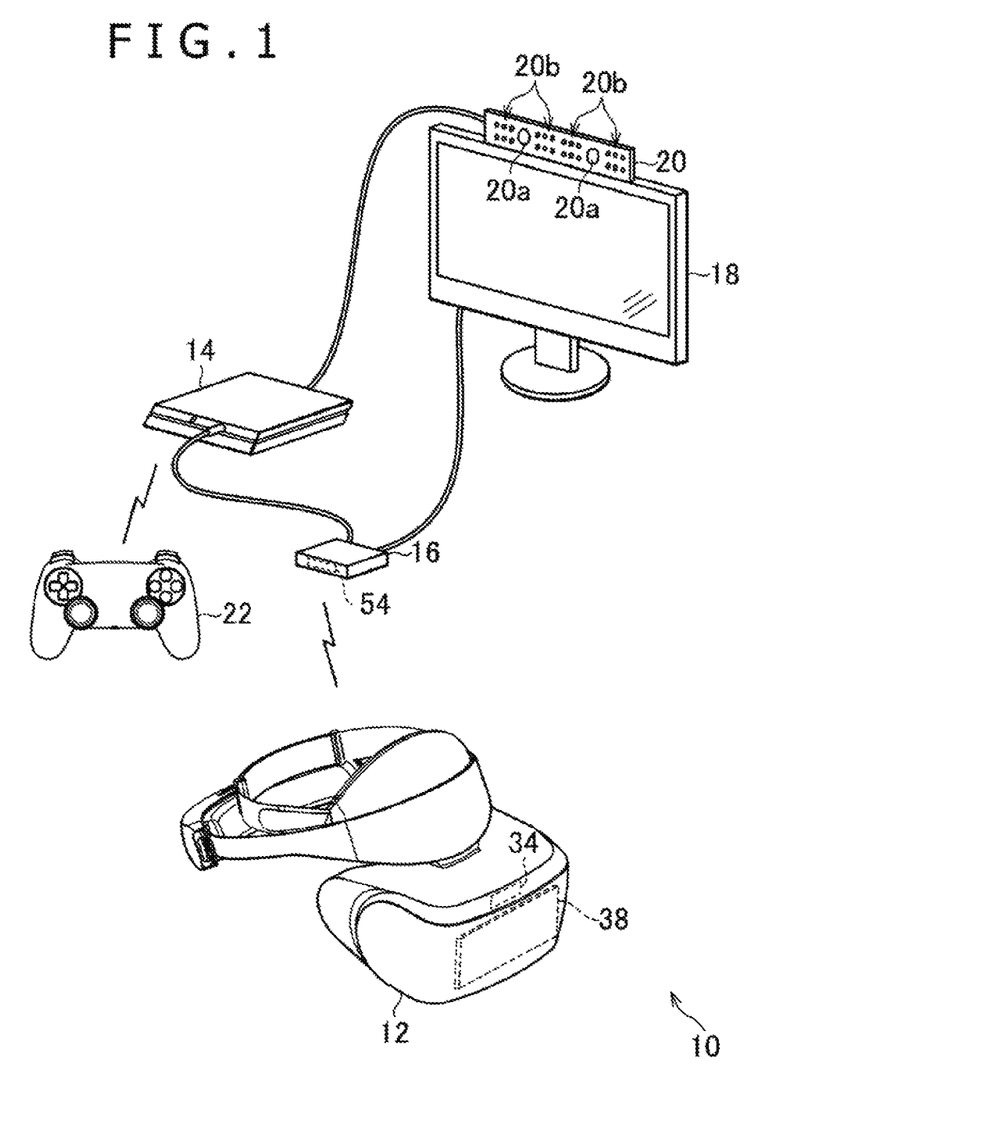
FIG. 1 is a diagram illustrating an example of the entire configuration of a video display system according to an embodiment of the present invention.
Figure 2A:
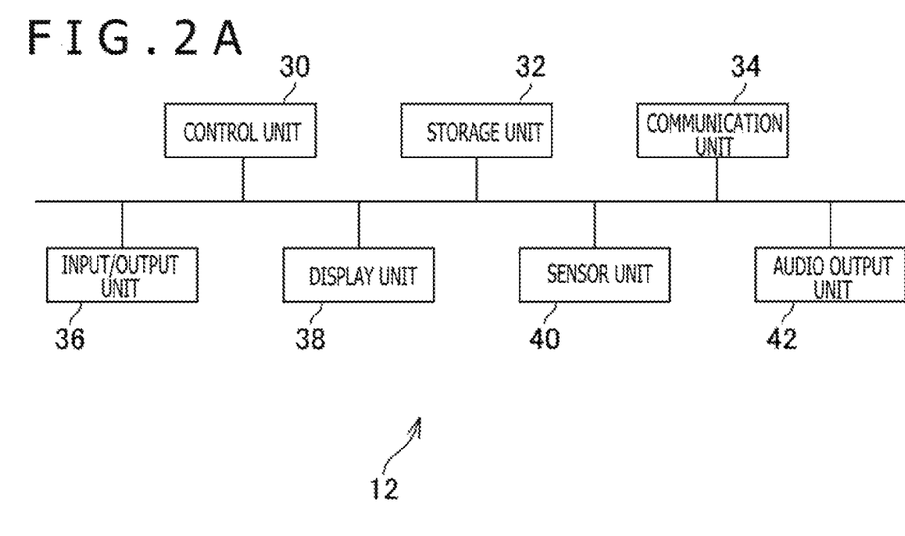
FIG. 2A is a diagram illustrating an example of a configuration of a head-mounted display according to an embodiment of the present invention.
Figure 2B:
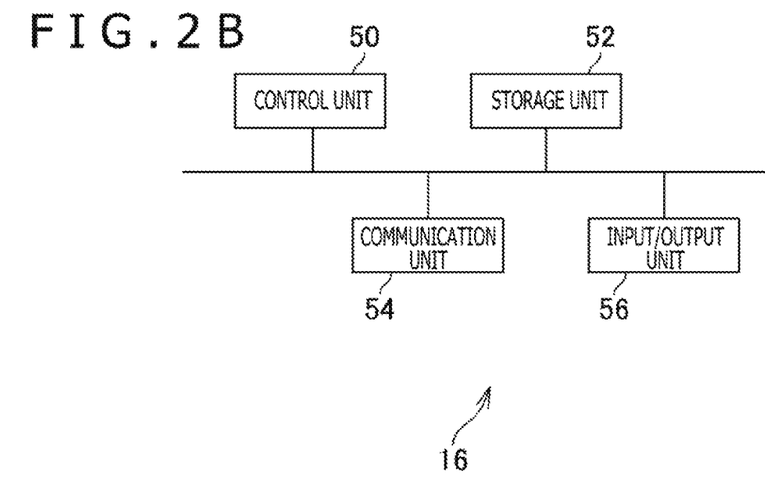
FIG. 2B is a diagram illustrating an example of a configuration of a relay device according to an embodiment of the present invention.

FIG. 1 is a diagram illustrating an example of the entire configuration of a video display system 10 according to an embodiment of the present invention. FIG. 2A is a diagram illustrating an example of a configuration of an HMD 12 according to the present embodiment. FIG. 2B is a diagram illustrating an example of a configuration of a relay device 16 according to the present embodiment.

As illustrated in FIG. 1, the video display system 10 according to the present embodiment includes the HMD 12, an entertainment device 14, the relay device 16, a display 18, a camera/microphone unit 20, and a controller 22.

In the HMD 12 according to the present embodiment, as illustrated in FIG. 2A, for example, a control unit 30, a storage unit 32, a communication unit 34, an input/output unit 36, a display unit 38, a sensor unit 40, and an audio output unit 42 are included.

The control unit 30 is a program control device such as a microprocessor operating in accordance with programs installed in the HMD 12.

The storage unit 32 is a storage device such as a read-only memory (ROM) or random access memory (RAM). In the storage unit 32, programs or the like executed by the control unit 30 are stored.

The communication unit 34 is a communication interface such as a wireless local area network (LAN) module in which an array antenna is built. In the present embodiment, as illustrated in FIG. 1, the communication unit 34 is disposed in the upper front side of the HMD 12.

The input/output unit 36 is an input/output port such as a high-definition multimedia interface (HDMI) (registered trademark) port, a universal serial bus (USB) port, or an auxiliary (AUX) port.

The display unit 38 is a display disposed on the front side of the HMD 12, such as a liquid crystal display or an organic electroluminescence (EL) display, and displays videos or the like generated by the entertainment device 14. Further, the display unit 38 is housed in a chassis of the HMD 12. For example, the display unit 38 may receive video signals output by the entertainment device 14 and relayed by the relay device 16, and output videos expressed by the video signals. The display unit 38 according to the present embodiment displays, for example, a left-eye image and a right-eye image to thereby display a three-dimensional image. Note that it may safely be said that the display unit 38 cannot display the three-dimensional image and can only display a two-dimensional image.

The sensor unit 40 is a sensor such as an acceleration sensor or a motion sensor. The sensor unit 40 outputs a measurement result of a rotation amount, a movement amount, or the like of the HMD 12 at a predetermined frame rate to the control unit 30.

The audio output unit 42 is, for example, headphones, a speaker, or the like and outputs audio or the like expressed by audio data generated by the entertainment device 14. The audio output unit 42 receives, for example, audio signals output by the entertainment device 14 and relayed by the relay device 16, and outputs audio expressed by the audio signals.

The entertainment device 14 according to the present embodiment is a computer such as a game console, a digital versatile disc (DVD) player, or a Blu-ray (registered trademark) player. The entertainment device 14 according to the present embodiment, for example, executes a stored game program, reproduces contents recorded on an optical disk, or the like to thereby generate a video or audio. Then, the entertainment device 14 according to the present embodiment outputs video signals expressing the generated videos or audio signals expressing the generated audio via the relay device 16 to the HMD 12 or the display 18.

The relay device 16 according to the present embodiment is a computer that relays the video signals or audio signals output from the entertainment device 14 and that outputs the video signals or audio signals to the HMD 12 or the display 18.

In the relay device 16 according to the present embodiment, for example, as illustrated in FIG. 2B, the control unit 50, the storage unit 52, the communication unit 54, and the input/output unit 56 are included.

The control unit 50 is a program control device such as a central processing unit (CPU) operating in accordance with programs installed in a control circuit or the relay device 16.

The storage unit 52 is a storage device such as a ROM or RAM. In the storage unit 52, programs or the like executed by the control unit 50 are stored.

The communication unit 54 is a communication interface such as a wireless LAN module in which an array antenna is built. In the present embodiment, as illustrated in FIG. 1, the communication unit 54 is included on the front side of the relay device 16.

The input/output unit 56 is an input/output port such as an HDMI (registered trademark) port or a USB port.

The display 18 according to the present embodiment is, for example, a liquid crystal display or the like and displays videos etc. expressed by the video signals output from the entertainment device 14.

The camera/microphone unit 20 according to the present embodiment includes, for example, cameras 20a that output an image obtained by imaging a photographic object to the entertainment device 14 and microphones 20b that acquire ambient audio, convert the audio into audio data, and output the audio data to the entertainment device 14. Further, the cameras 20a according to the present embodiment are a stereo camera.

The HMD 12 and the relay device 16 can, for example, transmit and receive data mutually by wireless communication. The entertainment device 14 and the relay device 16 are, for example, connected through an HDMI cable, a USB cable, or the like. The relay device 16 and the display 18 are, for example, connected through an HDMI cable or the like. The entertainment device 14 and the camera/microphone unit 20 are, for example, connected through an AUX cable or the like.

The controller 22 according to the present embodiment is an operation input device for performing an operation input to the entertainment device 14. A user depresses a direction key or button, or tilts an operation stick included in the controller 22 to thereby perform various types of operation inputs by using the controller 22. Then, in the present embodiment, the controller 22 outputs input data made to be correspondent to the operation input to the entertainment device 14. Further, the controller 22 according to the present embodiment includes a USB port. Then, the controller 22 is connected to the entertainment device 14 through a USB cable to thereby output input data to the entertainment device 14 by wire. Further, the controller 22 according to the present embodiment includes a wireless communication module or the like and can also output the input data wirelessly to the entertainment device 14.

In the present embodiment, wireless communication by millimeter waves such as 60 GHz band is performed between the HMD 12 and the relay device 16. Since the millimeter waves are strong in a straight advancing property, when a main beam direction is not appropriately adjusted, it is difficult to secure communication quality. In the present embodiment, a direction in which the communication quality is high is adjusted so as to be set to a main beam direction to thereby secure the communication quality.

As an example of a technique for setting the main beam direction, beam forming is known. A process of the beam forming is composed of a process of a sector-level sweep and a process of a beam refinement. In the sector-level sweep, a direction in which the communication quality is high at the time when communication is performed is determined, from among a plurality of candidates of the main beam directions, as the main beam direction of the HMD 12. Examples of the communication quality according to the present embodiment include a signal-to-noise ratio (S/N ratio), a reception strength, and the like. When the main beam direction of the HMD 12 is determined by the sector-level sweep, the process of the beam refinement in which the determined main beam direction of the HMD 12 is finely adjusted is executed. Note that also the sector-level sweep and the beam refinement are performed by communication (negotiation) between the communication unit 34 of the HMD 12 and the communication unit 54 of the relay device 16.

Figure 3:
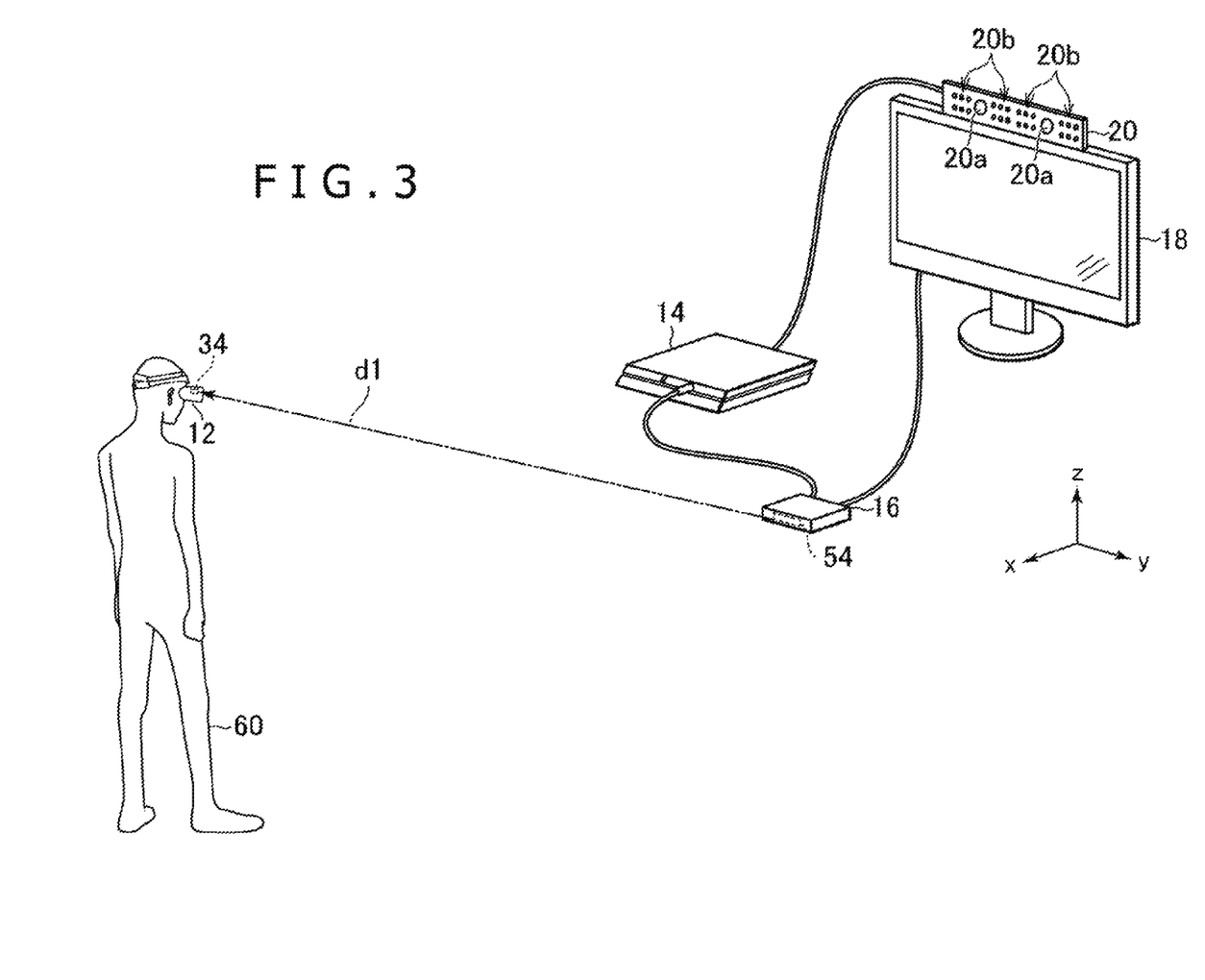
FIG. 3 is a diagram illustrating an example of an appearance in which communication is performed between the head-mounted display worn by a user and the relay device.

FIG. 3 is a diagram illustrating an example of an appearance in which communication is performed between the HMD 12 worn by a user 60 and the relay device 16. In FIG. 3, a direction dl that is the main beam direction for the relay device 16 is illustrated.

Figure 4:
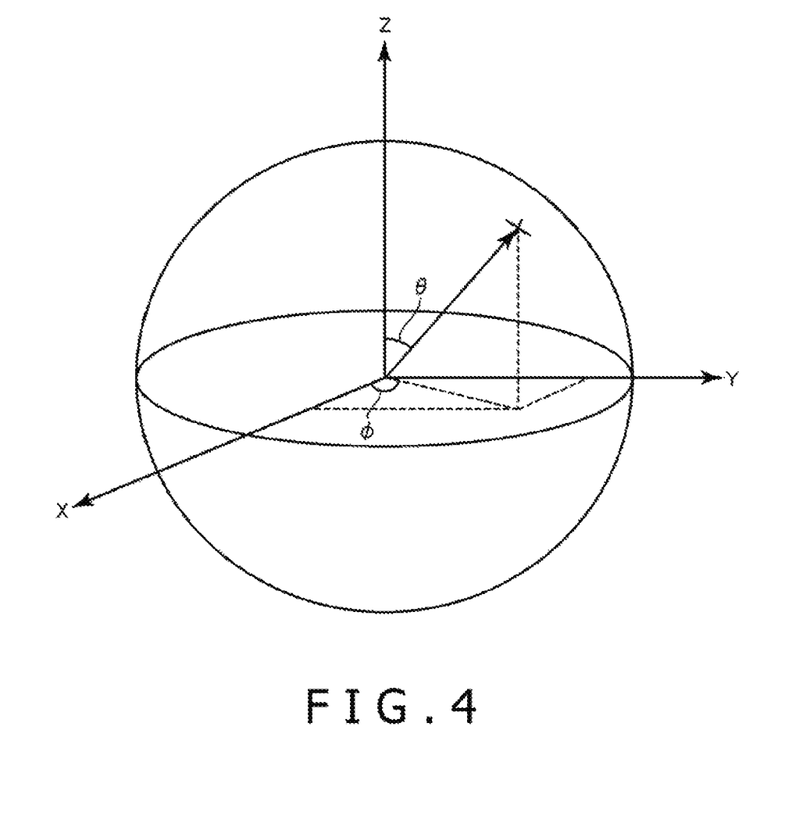
FIG. 4 is an explanation diagram explaining an example of a correspondence relationship between a main beam direction and a combination of an angle θ and an angle θ.

In the present embodiment, the main beam direction is expressed by a combination of an angle $\phi$ and an angle $\theta$. Hereinafter, the combination of the angle $\phi$ and the angle $\theta$ is referred to as main beam angle parameters $(\phi, \theta)$. FIG. 4 is an explanation diagram explaining an example of a correspondence relationship between the main beam direction and the combination of the angle $\phi$ and the angle $\theta$.

In the present embodiment, for example, a direction that is perpendicular to a plane in which the array antenna built in the relay device 16 is disposed and that directs to the front side from the back side of the relay device 16 is assumed to correspond to an X axis positive direction in FIG. 4. As illustrated in FIG. 3, the relay device 16 is disposed so that the front side of the relay device 16 directs to the HMD 12. Further, a direction (direction generally directing to the right from the left in FIG. 3) that is along the plane in which the array antenna built in the relay device 16 is disposed and that directs to the left side from the right side of the relay device 16 is assumed to correspond to a Y axis positive direction in FIG. 4. Further, a direction that is along the plane in which the array antenna built in the relay device 16 is disposed and the direction in which the Y axis positive direction is rotated by 90 degrees in a counterclockwise direction as viewed from the X axis positive direction is assumed to correspond to a Z axis positive direction. In the present embodiment, as illustrated in FIG. 4, an angle in which the counterclockwise direction is set to be positive on the basis of the X axis is assumed to be the angle $\phi$ as viewed from the Z axis positive direction. Further, an angle formed with the Z axis positive direction is assumed to be the angle $\theta$. For example, the main beam angle parameters $(\phi, \theta)$ that correspond to the X axis positive direction are $(0, +90)$. Note that in the present embodiment, a unit of values of the main beam angle parameters is assumed to be "degree." Further, in the present embodiment, it is assumed that $-180 \leq \phi \leq +180$ holds and $0 \leq \theta \leq 180$ holds.

Figure 5:
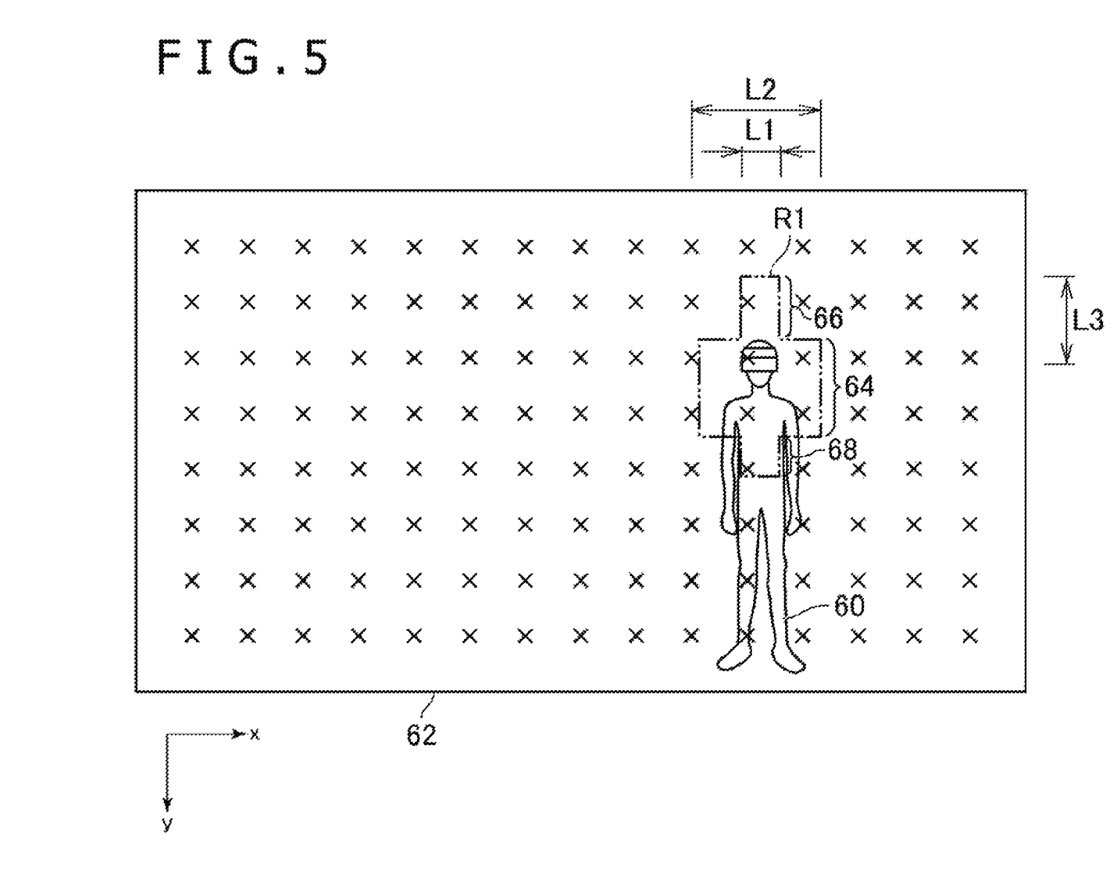
FIG. 5 is a diagram illustrating an example of a photographic image.

FIG. 5 is a diagram illustrating an example of a photographic image 62 that is photographed by the cameras 20a according to the present embodiment. In the photographic image 62 illustrated in FIG. 5, a figure of the user 60 wearing the HMD 12 is included. In the present embodiment, the cameras 20a generate the photographic image 62 at the predetermined frame rate. A right direction of the photographic image 62 illustrated in FIG. 5 is assumed to be the x axis positive direction and the lower direction of the photographic image 62 is assumed to be the y axis positive direction. Here, a combination of an x-coordinate and y-coordinate indicating a position within the photographic image 62 is assumed to be referred to as intra-photographic image coordinate parameters (x, y).

Further, in the present embodiment, positions within the photographic image 62 and the main beam directions are made to be correspondent to each other on one-on-one level. In the present embodiment, for example, the main beam angle parameters $(\phi, \theta)$ and the intra-photographic image coordinate parameters (x, y) are made to be correspondent to each other on one-on-one level.

In the photographic image 62 of FIG. 5, positions that are made to be correspondent to respective candidates of the main beam directions in the sector-level sweep are indicated by the "X" marks. Hereinafter, respective positions indicated by the "X" marks are assumed to be referred to as a primary candidate sector correspondence position. Further, the candidates of the main beam directions that are made to be correspondent to the primary candidate sector correspondence positions are assumed to be referred to as a primary candidate sector. In FIG. 5, the primary candidate sector correspondence positions that are made to be correspondent to 120 pieces of respective primary candidate sectors are illustrated.

In the present embodiment, a portion according to positions within the photographic image 62 of the figure of the user 60 are selected as secondary candidate sectors from among the primary candidate sectors. At the time of selecting this secondary candidate sector, communication (negotiation) between the HMD 12 and the relay device 16 is not required. In FIG. 5, a narrowed-down region R that is a border whether or not to be the secondary candidate sectors is illustrated. Hereinafter, positions that are made to be correspondent to the secondary candidate sectors, which are a portion of the primary candidate sector correspondence positions indicated by the "X" marks, are assumed to be referred to as a secondary candidate sector correspondent position. In the example of FIG. 5, six pieces of 120 pieces of primary candidate sector correspondence positions are selected as the secondary candidate sector correspondence positions.

The narrowed-down region R according to the present embodiment is, for example, a cross-shaped region that is bilaterally symmetrical and includes a rectangular central part 64, a rectangular projection part 66 upwardly stretching from the central part 64, and a rectangular projection part 68 downwardly stretching from the central part 64.

For example, the narrowed-down region R according to the present embodiment is set so that respective x coordinates in the center of the central part 64, the projection part 66, and the projection part 68 are the same as that in the center of a figure of a head of the user 60 in a case in which a posture of the user 60 stretches in a vertical direction. Here, for example, a center line of the head of the user 60 may be specified within the photographic image 62 by using a known skeleton determination technology or face recognition technology. Further, the respective x coordinates in the center of the central part 64, the projection part 66, and the projection part 68 may be the same as that of the specified center line as described above.

Further, the narrowed-down region R is set so that a lateral length L1 of the projection part 66 and the projection part 68 is the same as that of a figure of the head of the user 60 and a lateral length L2 of the central part 64 is predetermined times (for example, three times) as long as that of the figure of the head of the user 60. As described above, the size of the narrowed-down region R according to the present embodiment is that proportional to the size of the figure of the head of the user 60.

Further, the upper side of the projection part 66 in the narrowed-down region R is set in an upper position by a length L3 (for example, the length L3 corresponding to 50 centimeters in a real space) than the center of the figure of the head of the user 60. Here, the length L3 corresponding to 50 centimeters in the real space can be specified, for example, on the basis of data indicating a longitudinal length of the figure of the user 60 and a body height of the user 60 within the photographic image 62. Further, the lower side (the upper side of the central part 64) of the projection part 66 in the narrowed-down region R is set in a position of a figure of a parietal portion of the user 60. As described above, the projection part 66 may include an upper region than the figure of the head of the user 60. Further, the upper side (the lower side of the central part 64) of the projection part 68 in the narrowed-down region R is set in a position of a figure of a chest of the user 60 or slightly downward in the above position. Further, the lower side of the projection part 68 in the narrowed-down region R is set in a position of a figure of a waist of the user 60. A position of the figure of the chest or a position of the figure of the waist to be described above can be specified, for example, by using the skeleton determination technology. Even when the user 60 plays a game while being seated, the narrowed-down region R of the shape to be described above may be set.

Figure 6:
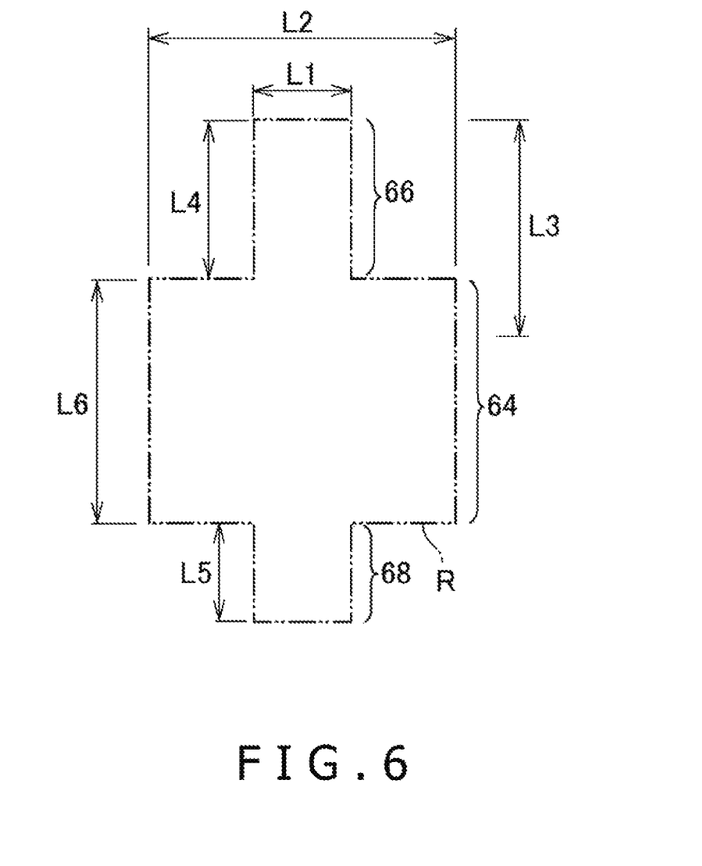
FIG. 6 is a diagram illustrating an example of a narrowed-down region.

Note that a method for specifying the narrowed-down region R is not limited to the foregoing method. As illustrated in FIG. 6, for example, the foregoing length L3, a longitudinal length L4 of the projection part 66, a longitudinal length L5 of the projection part 68, and a longitudinal length L6 of the central part 64 may be a length that is predetermined times as long as a longitudinal length of a face specified by using the face recognition technology. In addition, these lengths L3 to L6 may be set to be proportional to the longitudinal length (that is, the body height) of the figure of the user 60.

Further, the narrowed-down region R may be a region in which the region in a predetermined shape (for example, the cross-shaped region) is enlarged with similarity so as to be proportional to the size (the longitudinal lengths and the lateral lengths) of the figure of the head of the user 60 within the photographic image 62.

Further, a shape of data for managing the narrowed-down region R is not particularly limited. For example, positions within the photographic image 62 of the narrowed-down region R may be managed by parameters indicating the coordinate values in the center of the figure of the head of the user 60 and the foregoing lengths of the lengths L1 to L6. Further, for example, the positions within the photographic image 62 of the narrowed-down region R may be managed by the coordinate values of each vertex included in the narrowed-down region R. For example, when the narrowed-down region R is a region obtained by enlarging the region in the predetermined shape with similarity, the positions within the photographic image 62 of the narrowed-down region R may be managed by the coordinate values in the center of the figure of the head of the user 60 and respective enlargement ratios (reduction ratios) of the longitudinal lengths and the lateral lengths.

In the present embodiment, for example, the photographic image 62 of a frame in which the posture of the user 60 stretches in the vertical direction is specified on the basis of the photographic image 62 generated at the predetermined frame rate. Then, the narrowed-down region R to be described above is set within the photographic image 62 on the basis of the figure of the user 60 included in the specified photographic image 62. Then, the primary candidate sector correspondence positions within the set narrowed-down region R are selected as the secondary candidate sector correspondence position. Then, by the negotiation between the HMD 12 and the relay device 16, the communication quality is confirmed at the time of performing communication as the main beam direction the directions that are individually made to be correspondent to the secondary candidate sectors made to be correspondent to the selected secondary candidate sector correspondence positions. Further, a direction that is made to be correspondent to the secondary candidate sector in which the communication quality is highest is determined as the main beam direction.

In the present embodiment, the candidates of the main beam directions in which the communication quality is confirmed as described above are limited to a portion according to the positions of the figure of the head of the user 60 within the photographic image 62. Therefore, in the present embodiment, the number of the sectors in which the communication quality is confirmed by the negotiation between the HMD 12 and the relay device 16 is smaller than that of conventional beam forming. Therefore, according to the present embodiment, the main beam direction is specified at a time shorter than that of the conventional beam forming.

Further, there is a bias in directions in which the head of the user 60 moves in a situation in which the user 60 plays a game. For example, the possibility is high that the head of the user 60 moves in the vertical direction by an operation of jumping or an operation of squatting, or the head of the user 60 moves back and forth and around by an operation of tilting a neck or body. On the other hand, the possibility is low that the head of the user 60 moves in an oblique direction such as upper left, upper right, lower left, or lower right.

In the present embodiment, in view of such a bias in the directions in which the head of the user 60 moves, the candidates of the main beam directions in which the communication quality is confirmed are limited to the secondary candidate sectors that are made to be correspondent to the secondary candidate sector correspondence positions within the narrowed-down region R of the shape having the projection part 66 or the projection part 68 as illustrated in FIG. 5. As described above, in the present embodiment, the narrowing down of the candidates of the main beam directions is performed in view of the fact that there is the bias in the directions in which the head of the user 60 moves in the situation in which the user 60 plays a game.

Figure 7:
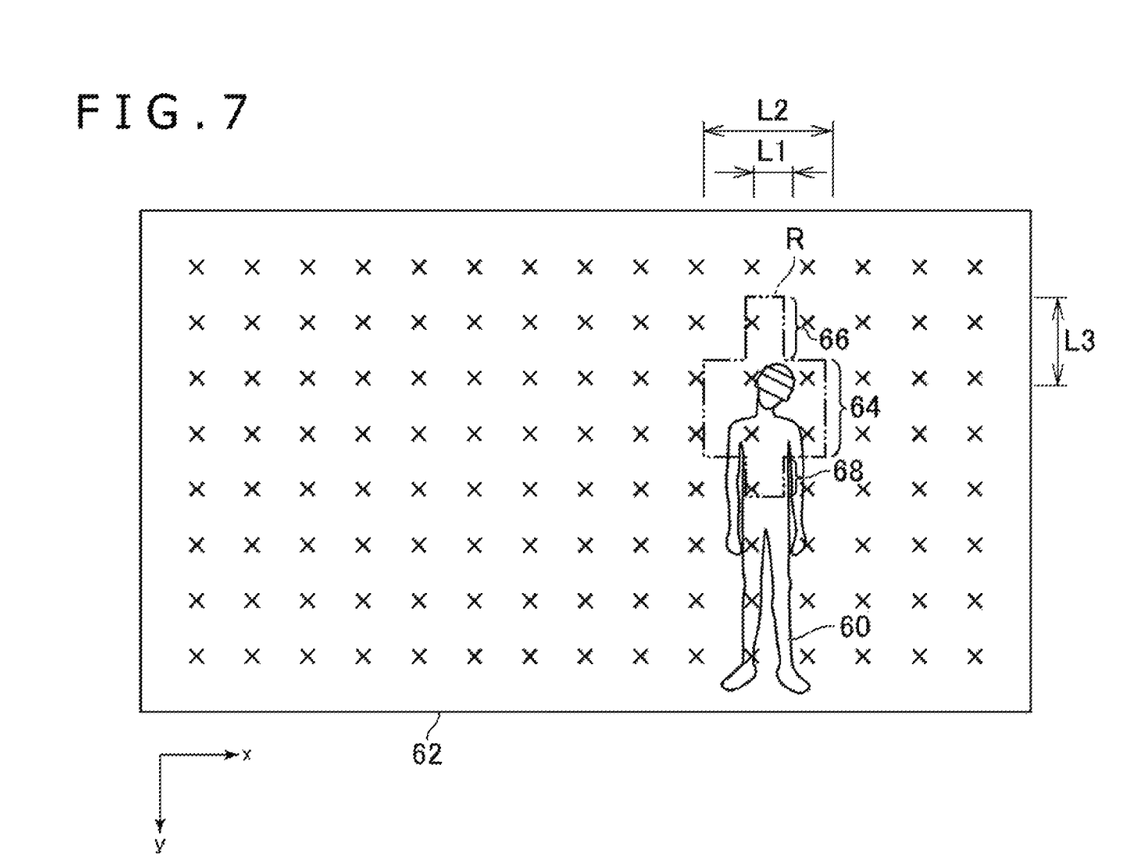
FIG. 7 is a diagram illustrating an example of the photographic image.
Figure 8:
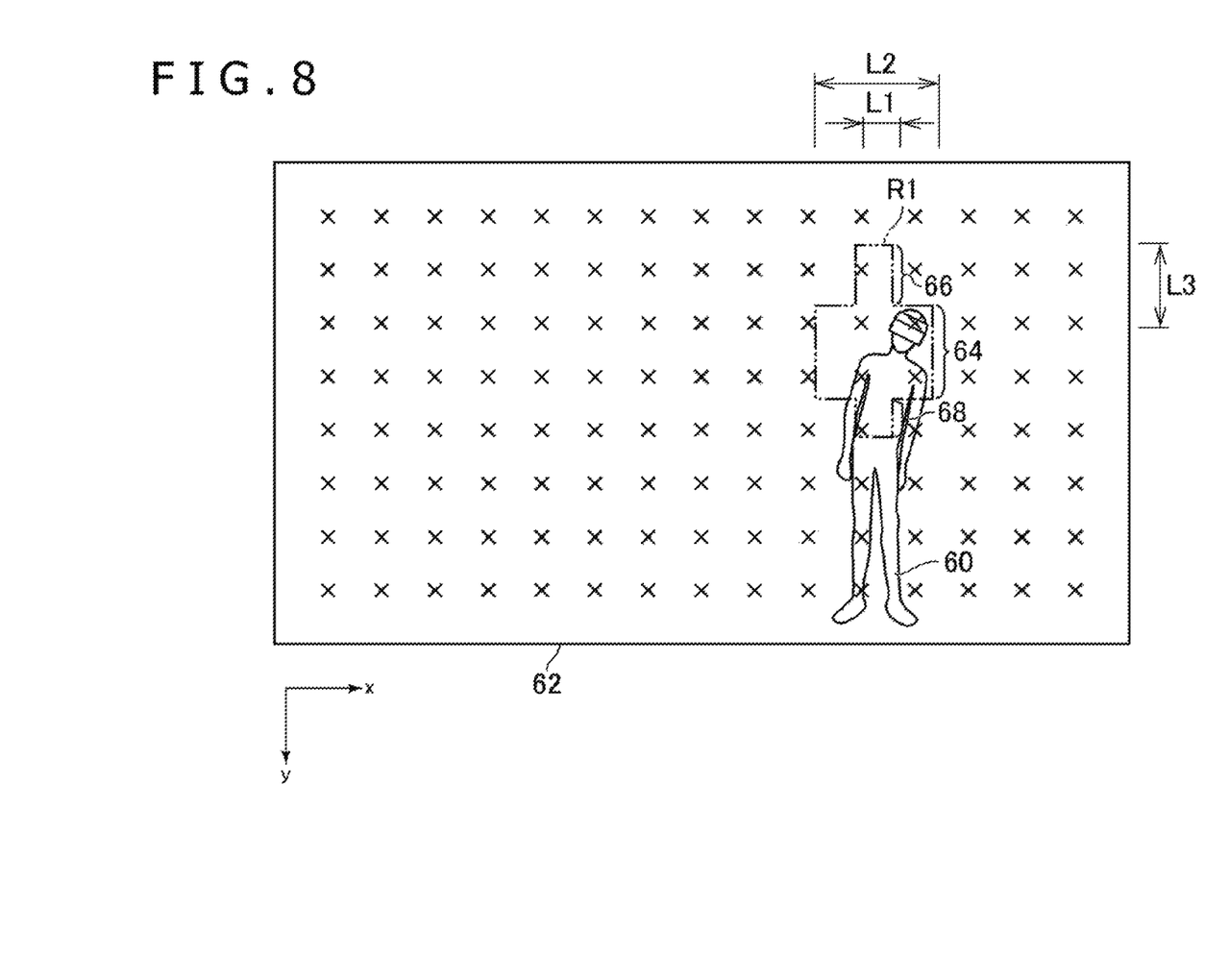
FIG. 8 is a diagram illustrating an example of the photographic image.

In FIG. 7, for example, an example of the photographic image 62 at the time when the user 60 tilts the head to the left is illustrated. In FIG. 8, an example of the photographic image 62 at the time when the user 60 tilts the body to the left is illustrated. Even in the situation illustrated in FIG. 7 or FIG. 8, the figure of the head of the user 60 is disposed within the narrowed-down region R. Therefore, even in the situation in which the head of the user 60 moves, according to the present embodiment, the main beam direction is selected from among the secondary candidate sectors that are made to be correspondent to the inside of the narrowed-down region R to thereby select the main beam direction in which the communication quality is high.

Hereinafter, the functions of the relay device 16 according to the present embodiment and the processes executed in the relay device 16 according to the present embodiment will be further described. The relay device 16 according to the present embodiment plays the role of the main beam direction determination device that determines the main beam direction for the relay device 16 from among a plurality of primary candidates of the main beam directions.

Figure 9:
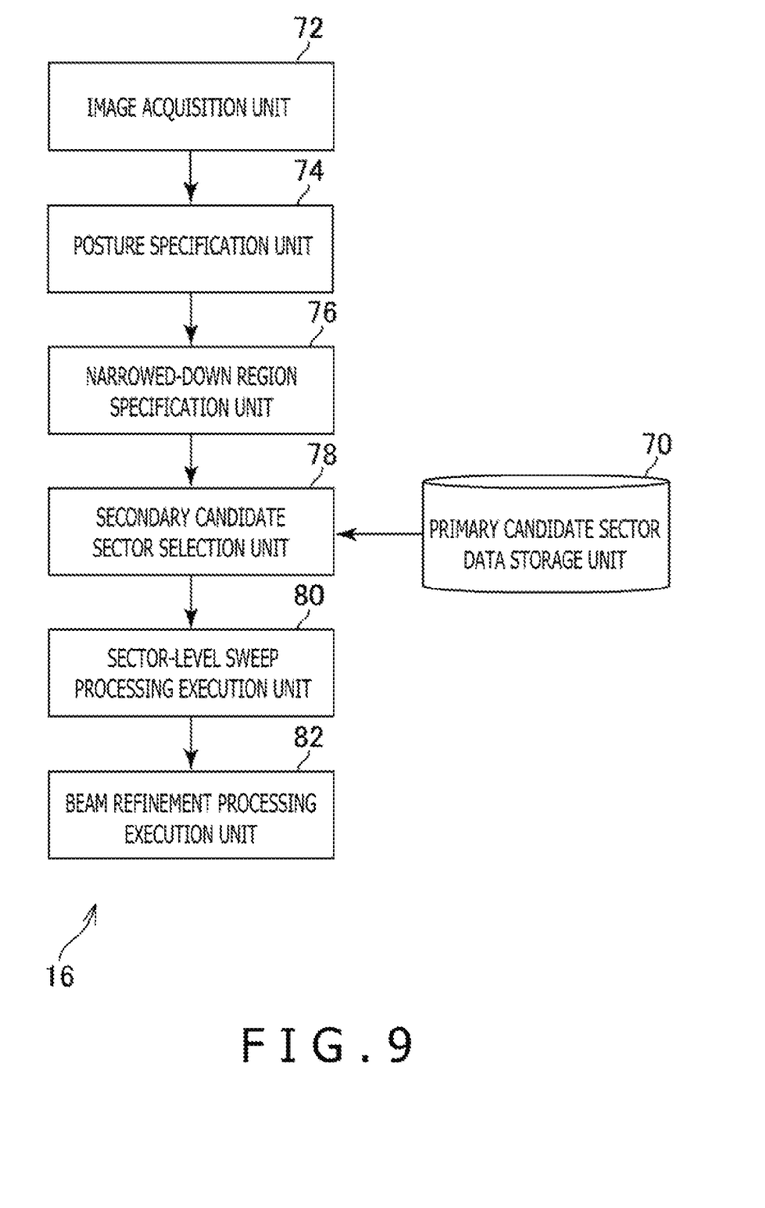
FIG. 9 is a functional block diagram illustrating an example of functions implemented by the relay device according to an embodiment of the present invention.

FIG. 9 is a functional block diagram illustrating an example of the functions implemented in the relay device 16 according to the present embodiment. Note that in the relay device 16 according to the present embodiment, all the functions illustrated in FIG. 9 are not necessarily implemented and functions other than the functions illustrated in FIG. 9 may be implemented.

As illustrated in FIG. 9, in view of the functions, for example, the relay device 16 according to the present embodiment includes a primary candidate sector data storage unit 70, an image acquisition unit 72, a posture specification unit 74, a narrowed-down region specification unit 76, a secondary candidate sector selection unit 78, a sector-level sweep processing execution unit 80, and a beam refinement processing execution unit 82. The primary candidate sector data storage unit 70 is implemented mainly as the storage unit 52. The image acquisition unit 72 is implemented mainly as the control unit 50 and the input/output unit 56. The posture specification unit 74, the narrowed-down region specification unit 76, and the secondary candidate sector selection unit 78 are implemented mainly as the control unit 50. The sector-level sweep processing execution unit 80 and the beam refinement processing execution unit 82 are implemented mainly as the control unit 50 and the communication unit 54.

The above functions may be implemented by executing, by the control unit 50, a program including commands corresponding to the above functions and installed in the relay device 16 that is a computer. This program is supplied to the relay device 16 via a computer readable information storage medium such as an optical disk, a magnetic disk, a magnetic tape, a magnetic optical disk, or a flash memory, or via the Internet etc.

Figure 10:
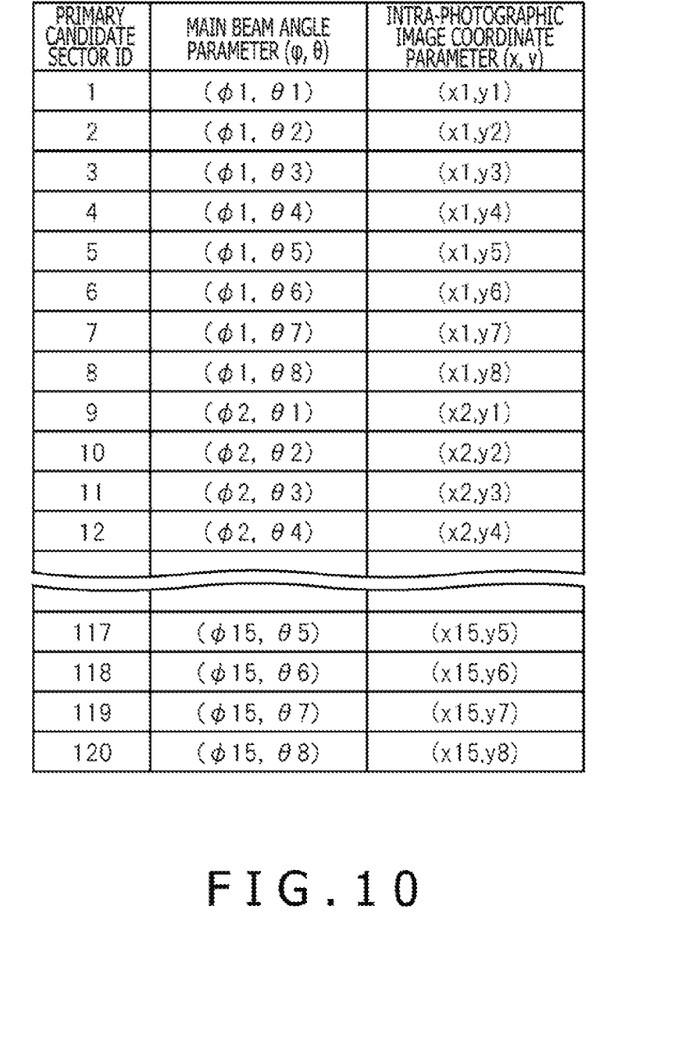
FIG. 10 is a diagram illustrating an example of primary candidate sector data.

In the present embodiment, for example, the primary candidate sector data storage unit 70 stores the primary candidate sector data indicating the primary candidate sector. In the primary candidate sector data according to the present embodiment, for example, as illustrated in FIG. 10, a primary candidate sector identification (ID) that is identification information of the primary candidate sector data, the foregoing main beam angle parameters ($\phi$, $\theta$), and the foregoing intra-photographic image coordinate parameters (x, y) are included. Further, in the present embodiment, as illustrated in FIG. 10, the primary candidate sector data storage unit 70 stores the primary candidate sector data in plurality. Further, the primary candidate sector indicated by the primary candidate sector data is made to be correspondent to an angle to the direction (for example, the X axis positive direction) to be the reference by using the main beam angle parameters ($\phi$, $\theta$). Further, in the primary candidate sector data, the main beam angle parameters ($\phi$, $\theta$) and the intra-photographic image coordinate parameters (x, y) are made to be correspondent to each other on one-on-one level. In the present embodiment, for example, as illustrated in FIG. 10, the angle $\phi$ of the main beam angle parameters ($\phi$, $\theta$) and the x coordinate of the intra-photographic image coordinate parameters (x, y) are made to be correspondent to each other on one-on-one level. Further, the angle $\theta$ of the main beam angle parameters ($\phi$, $\theta$) and the y coordinate of the intra-photographic image coordinate parameters (x, y) are made to be correspondent to each other on one-on-one level.

In the present embodiment, for example, the image acquisition unit 72 acquires an image including the figure of the user 60 wearing the HMD 12. In the present embodiment, for example, the image acquisition unit 72 acquires the photographic image 62 exemplified in FIGS. 5, 7, and 8, which is photographed at the predetermined frame rate by the cameras 20a, at the aforementioned frame rate.

In the present embodiment, for example, the posture specification unit 74 specifies the posture of the user 60 on the basis of the photographic image 62 acquired by the image acquisition unit 72. By a posture determination based on the known skeleton determination technology, for example, the posture specification unit 74 may specify whether or not the posture of the user 60 stretches in the vertical direction.

In the present embodiment, for example, the narrowed-down region specification unit 76 specifies, within the photographic image 62, a region including the figure of the head of the user 60 in a case in which the posture of the user 60 stretches in the vertical direction. In the present embodiment, for example, on the basis of the photographic image 62 acquired by the image acquisition unit 72, when the posture specification unit 74 specifies that the posture of the user 60 stretches in the vertical direction, the narrowed-down region specification unit 76 specifies the foregoing narrowed-down region R. Note that the narrowed-down region specification unit 76 may specify the foregoing values of various types of parameters. Specifically, for example, the narrowed-down region specification unit 76 may specify a value indicating at least one of the coordinate values in the center of the figure of the head of the user 60 and the foregoing lengths L1 to L6, the coordinate values of each vertex, the coordinate values in the center of the figure of the head of the user 60 and the respective enlargement ratios (reduction ratios) of the longitudinal lengths and the lateral lengths.

Further, the narrowed-down region specification unit 76 may include a centerline specification part for specifying a center line of the figure of the head of the user 60, which stretches in the vertical direction within the photographic image 62. Then, the narrowed-down region specification unit 76 may specify the bilaterally symmetrical narrowed-down region R with the specified center line as a center.

In the present embodiment, for example, the secondary candidate sector selection unit 78 selects, from among the plurality of primary candidates of the main beam directions, the secondary candidates that are directions made to be correspondent to the positions within the narrowed-down region R. In the present embodiment, for example, the secondary candidate sector selection unit 78 selects as the secondary candidate sector data indicating the secondary candidate sector the primary candidate sector data including as the intra-photographic image coordinate parameters (x, y) the coordinate values within the narrowed-down region R specified by the narrowed-down region specification unit 76. Note that in a selection process of the secondary candidate sector using the secondary candidate sector selection unit 78, the communication (negotiation) between the HMD 12 and the relay device 16 is not required. Note that the secondary candidate sector selection unit 78 may select the secondary candidate sector data on the basis of the foregoing values of the various types of parameters specified by the narrowed-down region specification unit 76.

In the present embodiment, for example, the sector-level sweep processing execution unit 80 determines the main beam direction for communication with the HMD 12 from among the secondary candidates selected by the secondary candidate sector selection unit 78. In the present embodiment, for example, the sector-level sweep processing execution unit 80 determines the main beam direction for the relay device 16 on the basis of the communication quality at the time when communication is performed setting the respective secondary candidate sectors selected by the secondary candidate sector selection unit 78 to the main beam directions. In the present embodiment, for example, in the negotiation between the HMD 12 and the relay device 16, the sector-level sweep processing execution unit 80 confirms the communication quality in the communication setting the respective secondary candidate sectors selected by the secondary candidate sector selection unit 78 to the main beam directions. Then, for example, the sector-level sweep processing execution unit 80 determines, as the main beam direction for the relay device 16, the main beam direction in which the communication quality is highest.

In the present embodiment, for example, the beam refinement processing execution unit 82 executes the beam refinement process of finely adjusting the main beam direction determined by the sector-level sweep processing execution unit 80. The beam refinement process is also executed by using the communication (negotiation) between the HMD 12 and the relay device 16.

Figure 11:
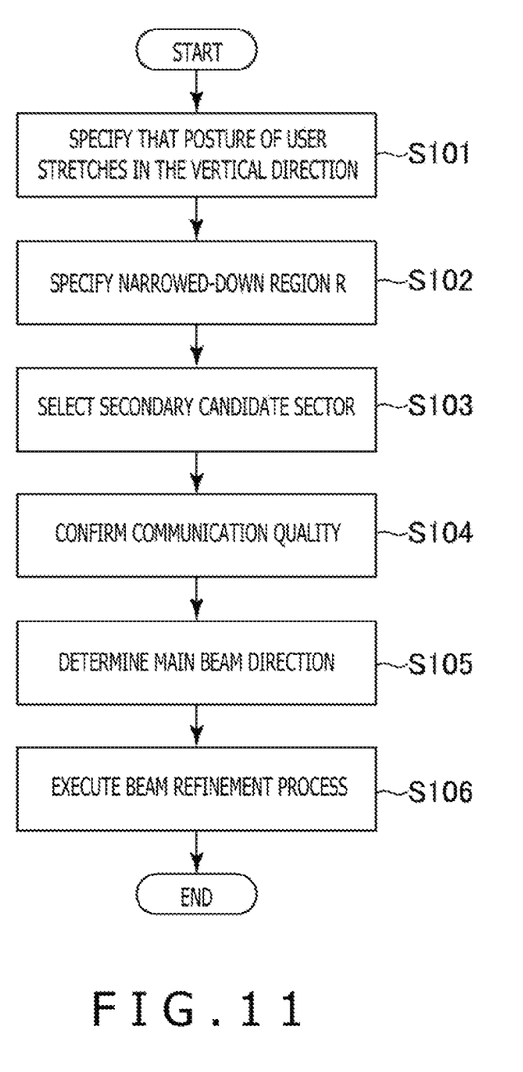
FIG. 11 is a flow diagram illustrating an example of a stream of a process executed in the relay device according to an embodiment of the present invention.

Hereinafter, an example of a stream of the setting processing of the narrowed-down region R, which is performed in the relay device 16 according to the present embodiment, will be described with reference to a flow diagram illustrated in FIG. 11. In the present embodiment, for example, on the basis of the photographic image 62 acquired by the image acquisition unit 72, when the posture specification unit 74 specifies that the posture of the user 60 stretches in the vertical direction, a process to be described below is assumed to be executed.

As described above, on the basis of the photographic image 62 acquired by the image acquisition unit 72, it is assumed that the posture specification unit 74 specifies that the posture of the user 60 stretches in the vertical direction (S101). Then, on the basis of positions of the figure of the user 60 within the photographic image 62, the narrowed-down region specification unit 76 specifies the narrowed-down region R (S102). In the process depicted in S102, for example, the foregoing values of the various types of parameters for expressing the narrowed-down region R are specified.

Then, on the basis of the narrowed-down region R specified in the process depicted in S102, the secondary candidate sector selection unit 78 selects the secondary candidate sectors from among the primary candidate sectors indicated by the primary candidate sector data (S103). Here, for example, the primary candidate sector data including as the intra-photographic image coordinate parameters (x, y) the coordinate values within the narrowed-down region R specified in the process depicted in S102 is selected as the secondary candidate sector data indicating the secondary candidate sectors.

In relation to all the secondary candidate sectors specified in the process depicted in S103, the sector-level sweep processing execution unit 80 confirms the communication quality at the time of performing communication in the main beam direction expressed by the aforementioned secondary candidate sectors (S104).

Then, the sector-level sweep processing execution unit 80 determines as the main beam direction for the HMD 12 the main beam direction expressed by the secondary candidate sector specified to be the highest communication quality in the process depicted in S104 (S105).

Then, the beam refinement processing execution unit 82 executes the beam refinement process of a fine adjustment of the main beam direction determined in the process depicted in S105 (S106). Then, the process depicted in the present process example ends. As described above, the negotiation between the HMD 12 and the relay device 16 is not performed in the processes depicted in S101 to S103 but the negotiation between the HMD 12 and the relay device 16 is performed in the processes depicted in S104 to S106.

Subsequently, communication is performed between the HMD 12 and the relay device 16 and here, for example, it is assumed that the communication quality between the HMD 12 and the relay device 16 is below a predetermined quality. In this case, the selection of the secondary candidate sectors does not need to be performed again. Specifically, for example, only the foregoing processes depicted in S104 to S106 may be executed. In such processes, even if the communication quality between the HMD 12 and the relay device 16 becomes worse, a reselection of the secondary candidate sectors is not performed but the sector-level sweep is performed. Therefore, a time until the main beam direction is determined again since the communication quality between the HMD 12 and the relay device 16 becomes worse can be shortened.

When the communication quality between the HMD 12 and the relay device 16 does not reach the predetermined quality even if the processes depicted in S104 to S106 end, the selection of the secondary candidate sectors may be performed again, that is, for example, the processes depicted in S101 to S106 may be executed.

Note that the present invention is not limited to the foregoing embodiment.

For example, when the communication quality between the HMD 12 and the relay device 16 is below the predetermined quality, the foregoing processes depicted in S101 to S106 may be executed.

For example, on the basis of the inside of the photographic image 62 including the figure of the user 60 in which the posture of the user 60 is not straight in the vertical direction, the narrowed-down region R may be set. In this case, for example, on the basis of a position estimated to be the position of the head of the user 60 in a case in which the posture of the user 60 stretches in the vertical direction, the narrowed-down region R may be set.

Further, for example, when the communication quality between the HMD 12 and the relay device 16 does not reach the predetermined quality even if the foregoing process depicted in S106 ends, the HMD 12 may confirm the communication quality at the time of performing communication in the main beam direction expressed by the aforementioned primary candidate sectors in relation to all the primary candidate sectors. Then, in this case, the HMD 12 may determine as the main beam direction for the HMD 12 the main beam direction expressed by the primary candidate sector specified to be the highest communication quality. Further, in this case, for example, the primary candidate sectors that are not selected as the secondary candidate sectors may be present.

Further, for example, a case in which the user 60 plays a game in a standing state and a case in which the user 60 plays a game in a sitting state may differ from each other in a shape of the narrowed-down region R.

Further, for example, a part or all of the functions exemplified in FIG. 9 may be implemented in the entertainment device 14.

Further, for example, the shape of the narrowed-down region R is not limited to that illustrated in FIG. 5 to FIG. 8. Further, the above-mentioned specific character strings or values and specific character strings or values in the drawings are illustrative and not limited to these character strings or values.

The invention claimed is:

1. A main beam direction determination device comprising:
   an image acquisition unit configured to acquire an image including a figure of a user wearing a head-mounted display;
   a region specification unit configured to specify, within the image, a region including a figure of a head of the user in a case in which a posture of the user stretches in a vertical direction;
   a secondary candidate selection unit configured to select, from among a plurality of primary candidates of main beam directions, secondary candidates that are directions made to be correspondent to positions within the region; and
   a main beam direction determination unit configured to determine, from among the secondary candidates, the main beam direction for communication with the head-mounted display, wherein
   the region has a projection part.

2. The main beam direction determination device according to claim 1, wherein the region is a cross-shaped region.

3. The main beam direction determination device according to claim 1, wherein the region is bilaterally symmetrical.

4. The main beam direction determination device according to claim 3, further comprising:
   a centerline specification unit configured to specify, within the image, a center line of the figure of the head of the user, wherein
   the region specification unit specifies a bilaterally symmetrical region with the center line as a center.

5. The main beam direction determination device according to claim 1, wherein the region occupied by the projection part includes a region above the figure of the head of the user.

6. The main beam direction determination device according to claim 1, wherein a size of the region is the size proportional to a size of the figure of the head of the user.

7. A main beam direction determination method comprising:
   acquiring an image including a figure of a user wearing a head-mounted display;
   specifying, within the image, a region including a figure of a head of the user in a case in which a posture of the user stretches in a vertical direction;
   selecting, from among a plurality of primary candidates of main beam directions, secondary candidates that are directions made to be correspondent to positions within the region; and
   determining, from among the secondary candidates, the main beam direction for communication with the head-mounted display, wherein
   the region has a projection part.

8. A non-transitory, computer readable storage medium containing a computer program, which when executed by a computer, causes the computer to carry out actions, comprising:
   acquiring an image including a figure of a user wearing a head-mounted display;
   specifying, within the image, a region including a figure of a head of the user in a case in which a posture of the user stretches in a vertical direction;
   selecting, from among a plurality of primary candidates of main beam directions, secondary candidates that are directions made to be correspondent to positions within the region; and
   determining, from among the secondary candidates, the main beam direction for communication with the head-mounted display, wherein
   the region has a projection part.

* * * * *